(12) United States Patent
Bernhard et al.

(10) Patent No.: US 7,048,088 B2
(45) Date of Patent: May 23, 2006

(54) ELECTRIC SERVO-ASSISTED STEERING SYSTEM FOR MOTOR VEHICLES

(75) Inventors: Werner Bernhard, Moegglingen (DE); Achim Schust, Gaildorf (DE); Oliver Hetzel, Waldstetten (DE); Joachim Fischer, Schwäbisch Gmünd-Bargau (DE)

(73) Assignee: ZF Lenksysteme GmbH, Schwaebisch Gmuend (DE)

( * ) Notice: Subject to any disclaimer, the term of this patent is extended or adjusted under 35 U.S.C. 154(b) by 0 days.

(21) Appl. No.: 10/468,418

(22) PCT Filed: Oct. 15, 2002

(86) PCT No.: PCT/EP02/11494

§ 371 (c)(1),
(2), (4) Date: Jun. 18, 2004

(87) PCT Pub. No.: WO03/051702

PCT Pub. Date: Jun. 26, 2003

(65) Prior Publication Data

US 2004/0222036 A1    Nov. 11, 2004

(30) Foreign Application Priority Data

Oct. 15, 2002  (DE) ................ 101 61 715

(51) Int. Cl.
*B62D 5/06* (2006.01)
(52) U.S. Cl. ........................ 180/444; 74/427
(58) Field of Classification Search ........ 180/443–446; 74/427
See application file for complete search history.

(56) References Cited

U.S. PATENT DOCUMENTS

| 3,945,456 | A | * | 3/1976 | Strauff ...................... 180/427 |
| 5,147,007 | A | * | 9/1992 | Kahrs et al. ................ 180/421 |
| 5,605,071 | A | * | 2/1997 | Buchanan, Jr. .............. 74/425 |
| 5,738,183 | A | * | 4/1998 | Nakajima et al. ........... 180/444 |
| 5,953,978 | A | * | 9/1999 | Bohner et al. ............ 91/363 A |
| 6,044,723 | A |   | 4/2000 | Eda et al. |
| 6,412,591 | B1 |   | 7/2002 | Endo et al. |
| 6,708,796 | B1 | * | 3/2004 | Kinme et al. ............... 180/444 |
| 6,860,829 | B1 | * | 3/2005 | Bock et al. ................... 475/18 |
| 2002/0017420 | A1 |   | 2/2002 | Kinme et al. |

FOREIGN PATENT DOCUMENTS

| DE | 198 22 478 | 12/1998 |
| DE | 199 56 713 | 6/2000 |
| DE | 199 44 133 | 10/2000 |
| DE | 101 23 767 | 11/2001 |
| EP | 1 225 116 | 7/2002 |
| JP | 2002-67991 | 3/2002 |

OTHER PUBLICATIONS

Patent Abstract of Japan, vol. 2002, No. 07, Jul. 3, 2002.

\* cited by examiner

*Primary Examiner*—Kevin Hurley
(74) *Attorney, Agent, or Firm*—Kenyon & Kenyon LLP

(57) ABSTRACT

An electric power assisted steering system for motor vehicles having a worm gear mechanism is operatively connected to a drive shaft of an electric drive motor. A radial load is applied to the worm by a prestressing device, the prestressing device being configured as a hydraulic pressure device. It is possible to connect the drive shaft to the worm by a coupling, and the worm is mounted in this region by a pivotable bearing.

6 Claims, 4 Drawing Sheets

ELECTRIC SERVO-ASSISTED STEERING SYSTEM FOR MOTOR VEHICLES

The invention relates to an electric power assisted steering system for motor vehicles having a worm gear mechanism in accordance with the precharacterizing clause of claim 1.

An electric power assisted steering system of the generic type for motor vehicles is disclosed in DE 199 44 133 A1.

The document of the generic type reveals an electric power assisted steering system having an input shaft which is operatively connected to a steering handwheel and serves for transmitting a torque which is required to steer steerable wheels. An output element is operatively connected to the steerable wheels and has power assistance applied to it by an electric drive motor. A stepdown gear mechanism configured as a worm gear mechanism is connected to the electric drive motor and the output element. A prestressing device, which prestresses the worm radially or subjects it to a radial load, is provided in order to eliminate the noises produced as a result of the play in the worm gear mechanism. The play in the worm gear mechanism is eliminated by the slight radial prestressing between the worm and the worm gear. When the radial prestressing is configured, it must be adapted such that the frictional forces produced do not cause the worm gear mechanism to jam.

Although the tooth-flank play is improved as a result of the document of the generic type, the forces which occur between the worm and the worn gear in the operating state cannot be completely compensated for. The maximum prestressing effect of the prestressing device is limited, as the worm gear mechanism would otherwise jam. However, the operating forces which occur are far above the maximum prestressing force, which is usually 15 to 20 N.

In relation to the further prior art, reference is also made to DE 198 22 478 A1. Provision is made here for an elastic body to be arranged such that, if a tooth surface of the worm are placed in contact with one another with a tooth surface of the worm gear, a rotary shaft is moved, with deformation of the elastic body.

In similar fashion to the document of the generic type, it is also not possible to compensate for the operating forces of the worm gear mechanism by this means, and it is thus not possible to advantageously reduce noise.

Further disadvantages, which are eliminated neither by the solutions disclosed in the prior art nor by the two cited documents, comprise the wear increasing over the service life and thus the tooth-flank play and hence the rattling and vibration noises increasing further. Wear adjustment is not possible.

Disadvantageously, the known solutions are also not capable of setting themselves automatically. A significant simplification of the work and therefore reduction in costs would result if the worm were capable of setting itself automatically in relation to the worm gear, in particular when new.

Moreover, the known solution has the disadvantage that temperature fluctuations and also fluctuations in the relative air humidity, which have varying effects on the worm gear mechanism on account of varying material coefficients of expansion and coefficients of water absorption, cannot be compensated for. This can likewise lead to rattling and vibration noises, and also to the worn gear mechanism distorting and jamming. The influence of temperature fluctuations is also a problem because the crown gear used is frequently formed from plastic and the plastic used for this purpose has a relatively high coefficient of thermal expansion. Generally, such plastics are unreinforced, as they are the most suitable for this purpose, but they are subject to relatively large expansion in the event of severe temperature fluctuations. Said expansion of the plastic can result in the worm gear mechanism distorting. This also applies analogously when water is absorbed from the air and the resulting plastic swelling occurs.

The present invention is therefore based on the object of eliminating the abovementioned disadvantages of the prior art, in particular of improving an electric power assisted steering system for motor vehicles having a worm gear mechanism to such an extent that noise is reduced to a minimum, automatic setting when new and wear adjustment are possible, and, moreover, temperature fluctuations as well as fluctuations in the relative air humidity can be compensated for.

This object is achieved according to the invention by the characterizing features of claim 1.

The various tasks, firstly adjustment of a prestressing force and secondly absorption of the operating force, are separated by virtue of the fact that the prestressing device is configured as a hydraulic pressure device. It is possible to hold the worm in engagement with the worm gear without play by means of a prestressing force, while the operating forces are compensated for by the hydraulic damping. It is thus possible to select a small prestressing force and at the same time achieve, by means of the hydraulic damping, such a damping effect that high operating forces can be absorbed without problems.

The hydraulic pressure device affords a further advantage during installation of the steering system. The hydraulic pressure device sets itself automatically, with the result that it is not necessary to set the tooth-flank play of the worm gear mechanism. This makes it possible to install the apparatus according to the invention separately.

The worm gear mechanism can be set optimally and automatically by virtue of the fact that it is possible to connect the worm to the drive shaft by means of a coupling and a pivotable bearing arranged in this region. The wear which occurs over the service life can thus be compensated for automatically, so that the tooth-flank play is not increased and rattling and vibration noises are avoided. Fluctuations, which result from the relative air humidity or as a function of temperature from the various coefficients of expansion of the materials, can likewise be compensated for automatically by the automatic adjustment, brought about by the pivotable bearing and the hydraulic pressure device. It is thus possible firstly to avoid rattling and vibration noises and secondly to reliably prevent the worm gear mechanism distorting or jamming as a result of certain materials expanding excessively.

The solution according to the invention advantageously ensures that the toothing of the worm gear mechanism engages without play and the high operating forces which occur are compensated for.

Furthermore, it may be provided according to the invention for the worm to be prestressed by a prestressing spring of the hydraulic pressure device.

As has emerged in tests, the various tasks can be separated particularly effectively and inexpensively by the prestressing spring. Tooth-flank play can be suppressed by suitably adjusting the prestressing spring, while at the same time the high operating forces which occur are compensated for by the hydraulic component of the hydraulic pressure device. The toothing of the worm is thus pressed without play into toothing engagement with the worm gear by means of the prestressing spring.

It is advantageous for the pivotable bearing to be configured as a four point bearing with a pivot ring.

Firstly, this refinement makes larger angles for adjusting the worm possible, and secondly a lack of axial play is nevertheless ensured. The noise problems are suppressed by the fact that there is no axial play in the bearings. The advantage of conventional four point bearings, which is that they have very small axial play and thus no noise occurs as a result of axial impact (i.e. noise in the form of ball impact when the direction of the axial forces changes), can be utilized by the pivot ring. The characteristic feature of conventional four point bearings, namely that they only permit very slight oblique positions of the shaft, in this case of the worm, is advantageously overcome by arranging the four point bearing in the pivot ring. It is thus possible to mount the worm axially with very little play and nevertheless to achieve a large oblique position without increased coefficients of friction and noise occurring.

This is advantageously possible by grinding the outer ring of the bearing to be spherical or rounded and by installing a pivot ring, which allows the four point bearing to pivot, on the spherical outer ring of the four point bearing.

Advantageous developments and refinements of the invention emerge from the further subclaims and from the exemplary embodiments described below in basic form using the drawing, in which:

Electric power assisted steering systems for motor vehicles having a worm gear mechanism are sufficiently known, for example from DE 199 44 133 A1, for which reason only the features essential to the invention are discussed in greater detail in the following text.

Figure 1:
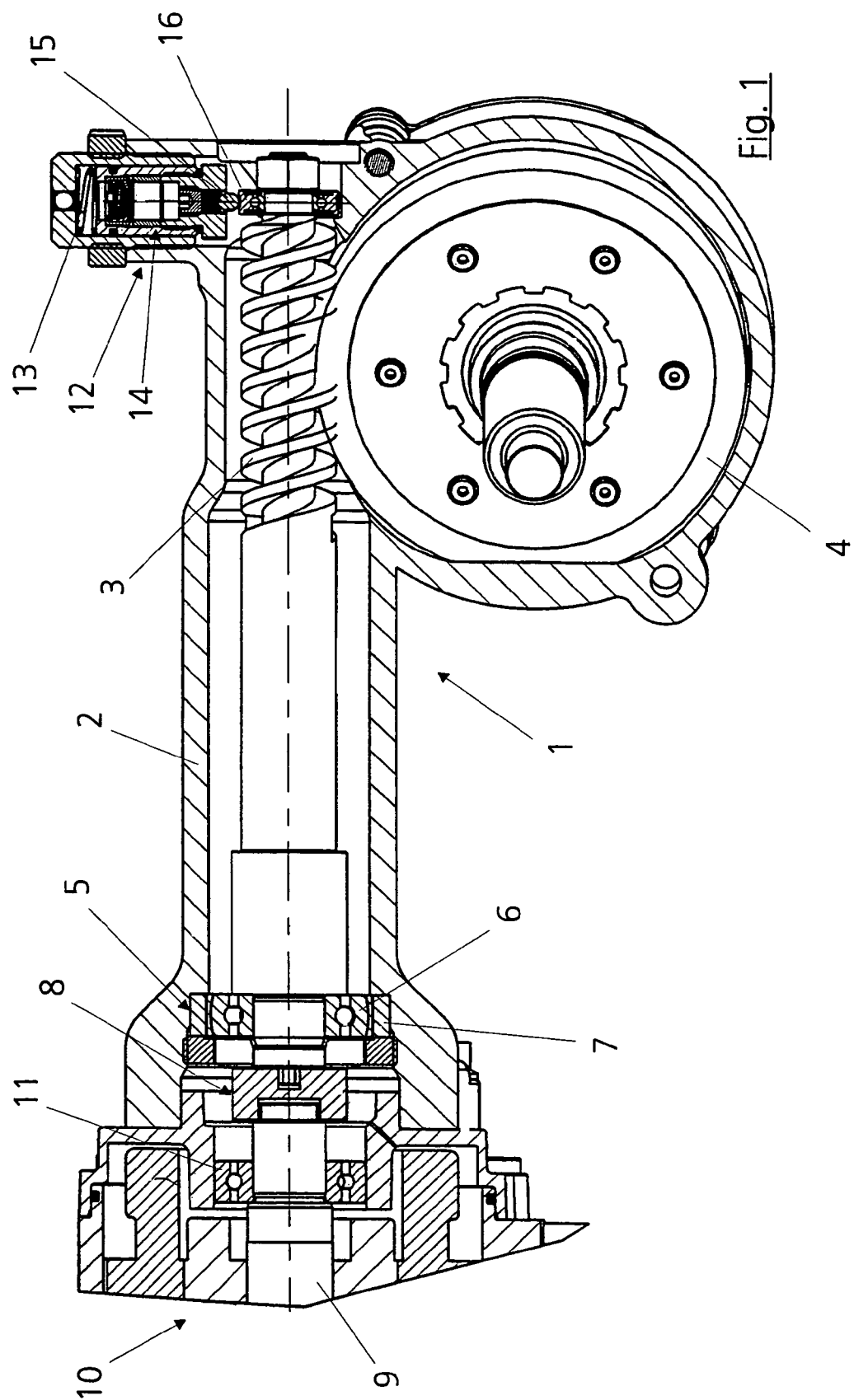
FIG. 1 shows a section through a worm gear mechanism which is connected to a drive shaft of an electric drive motor.

FIG. 1 shows a detail of an electric power assisted steering system for motor vehicles having a worm gear mechanism 1 arranged in a housing 2. The worm gear mechanism 1 has a worm 3 and a worm gear 4. The worm 3 is mounted in a pivotable bearing 5. In the present exemplary embodiment, the pivotable bearing 5 is formed from a four point bearing 6 which is arranged in a pivot ring 7. The worm 3 is connected to a drive shaft 9, which is operatively connected to a drive motor 10 (not shown in greater detail), by means of a coupling 8 (shown in greater detail in FIG. 4 and FIG. 5).

The drive shaft 9 is mounted in a bearing 11 in the usual fashion.

As can likewise be seen from FIG. 1, the worm 3 is acted on radially by a hydraulic pressure device 12. By means of the hydraulic pressure device 12, the worm 3 and the worm gear 4 are made to engage without play and the operating forces occurring are compensated for. Here, the prestressing force is provided by a prestressing spring 13. A hydraulic device 14, which is known in principle, of the hydraulic pressure device 12 is provided to compensate for the operating forces occurring. Two advantageous hydraulic pressure devices 12 can be seen in FIGS. 2 and 3.

A pressure piece 15 of the hydraulic pressure device 12 acts on a bearing 16, arranged in this region, of the worm 3 and thus influences the play between the worm 3 and the worm gear 4. In order that the bearing 16 or the worm 3 can be moved correspondingly radially by the hydraulic pressure device 12 or the pressure piece 15, it is feasible to arrange said bearing 16 or worm 3 in a slot or a groove which is easily conceivable and therefore not shown in greater detail. Moreover, the use of suitable bearings is possible, for example of an oscillating bearing.

Figure 2:
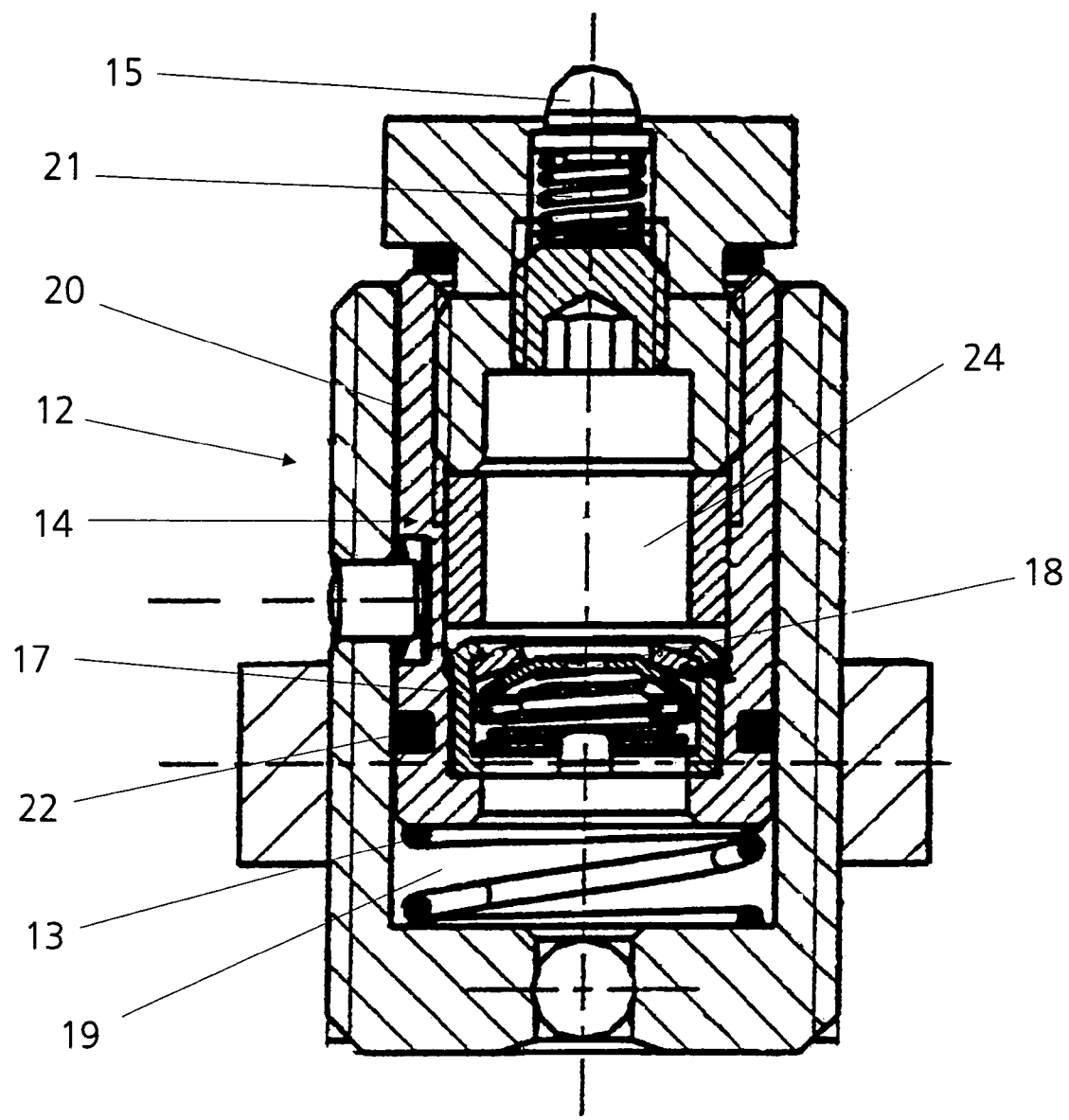
FIG. 2 shows a first embodiment of a hydraulic pressure device.

A nonreturn valve 17 having an orifice bore 18 can be seen in FIG. 2, said nonreturn valve 17 taking over a function known in principle in the hydraulic device 14 and thus permitting a flow of oil to flow away from an oil space 19 in a manner throttled only by the orifice bore 18, if said oil space 19 is subjected to a corresponding load by the pressure piece 15 by means of a plunger 20. The hydraulic pressure device 12 shown in FIG. 2 is in principle of a known construction, for which reason only the essential features have been discussed. In order to compensate for production related deviations in roundness, the hydraulic pressure unit 12 has a compression spring 21 which compensates for the highly dynamic components of the toothing play between the worm 3 and the worm gear 4.

It is disadvantageous, however, in the case of the hydraulic pressure device 12 shown in FIG. 2 that, if the oil space 19 is subjected to a corresponding pressure, the resulting high pressure acts on the sealing ring 22 and thus high demands are made on the latter with regard to the sealing effect. The hydraulic pressure device 12 shown in FIG. 3 offers an alternative advantageous solution to this.

Figure 3:
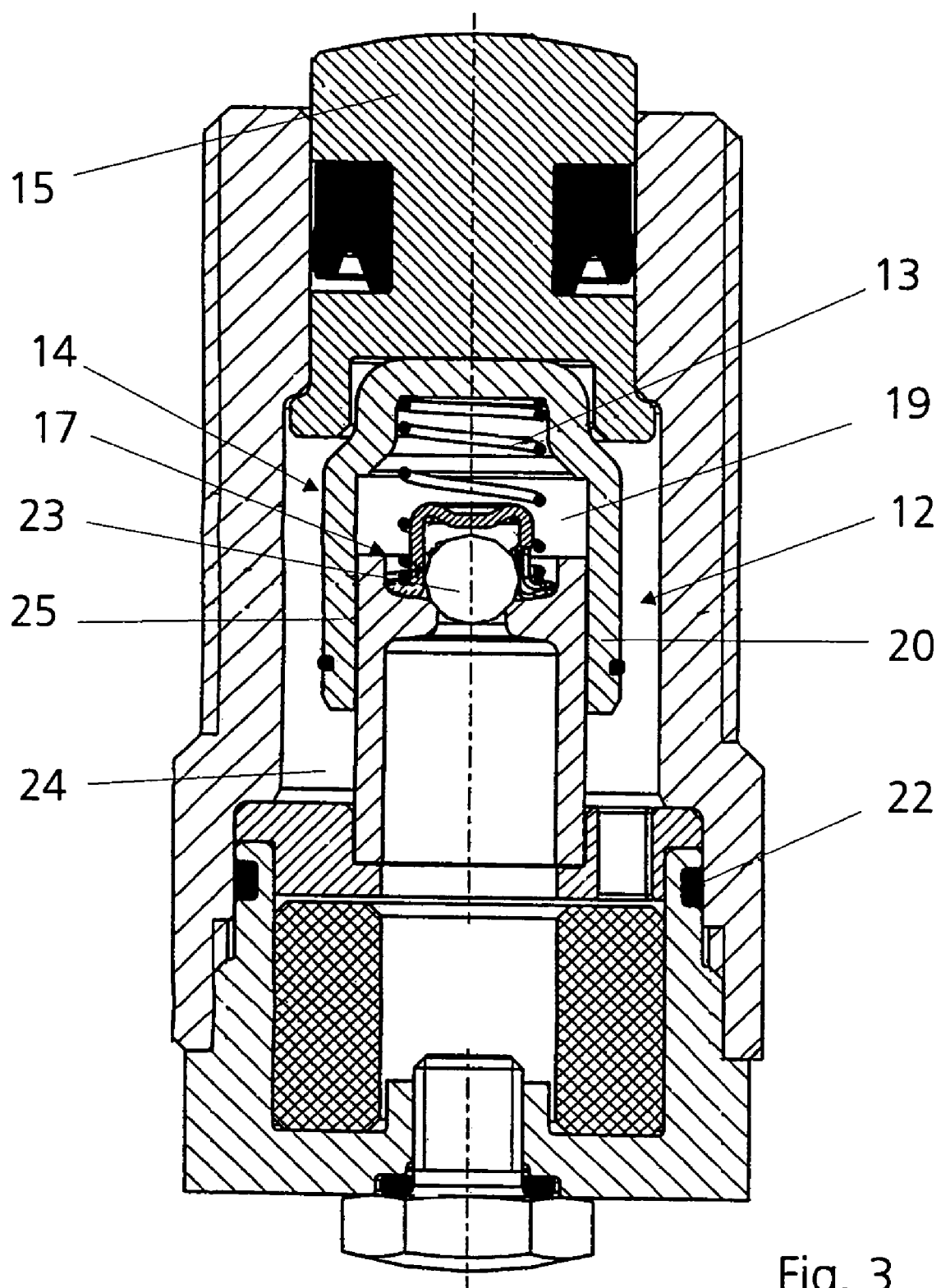
FIG. 3 shows a second embodiment of a hydraulic pressure device.

The hydraulic pressure device 12 shown in FIG. 3 has a nonreturn valve 17 which separates the oil space 19, to which high pressure can be applied, from a low pressure oil space 24 by means of a ball 23. The method of operation here is analogous to the hydraulic pressure device 12, already described in FIG. 2, and is known in principle. A corresponding movement of the pressure piece 15 builds up a high pressure in the oil space 19 counter to the force of the prestressing spring 13 and through the nonreturn valve 17 which high pressure can only dissipate through a gap 25 in a highly throttled manner. As a result, the high operating forces between the worm 3 and the worm gear 4 are compensated for. The gap 25 can measure, for example, 3μ and is arranged between an inner wall of the plunger 20 and an outer wall of the housing of the nonreturn valve 17. As a result of the configuration shown in FIG. 3, the seal 22 is loaded only with the pressure in the low pressure oil space 24.

As a result of the nonreturn valve 17, or the orifice bore 18 (FIG. 2) or the ball 23 (FIG. 3), the hydraulic device 14 can compensate, over a defined time constant, for the thermal expansion and the water absorption of the worm 3 by it being possible for the plunger 20 to yield in a defined manner.

Figure 4:
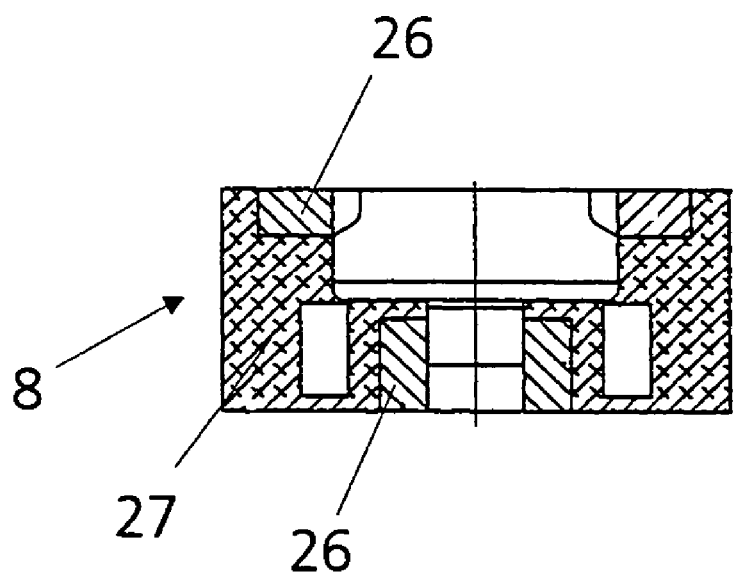
FIG. 4 shows a section through a coupling having two sheet metal moldings injection molded into an elastomer.
Figure 5:
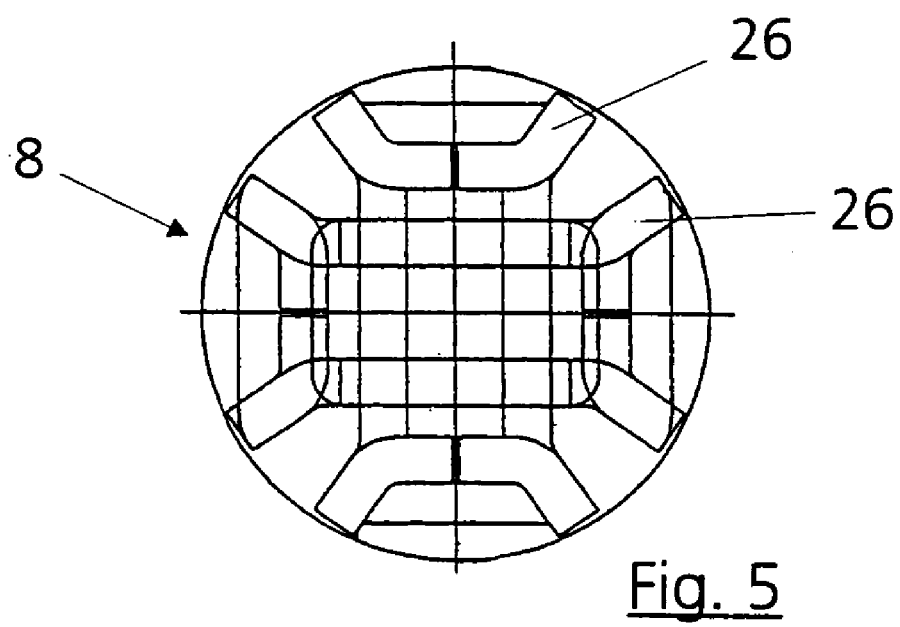
FIG. 5 shows a plan view of the sheet metal moldings in accordance with FIG. 4.

An advantageous coupling of the worm 3 to the drive shaft 9 is shown in FIGS. 4 and 5. The coupling 8 is formed from two metal or sheet metal moldings 26 which have been vulcanized into an elastomer 27. The sheet metal moldings 26 are shaped by drivers such that they still afford an emergency running property if the elastomer 27 is destroyed. The coupling to the worm 3 or the drive shaft 9 can be effected by rectangular drivers on the respective shafts 3, 9.

As has been shown in tests, a coupling 8 of this type can be realized in a particularly simple and cost saving manner. As shown in FIG. 5, the sheet metal moldings 26 are advantageously laid on top of one another in the form of a cross and subsequently vulcanized into the elastomer. It has proven particularly suitable to arrange the two sheet metal moldings 26 offset by 90°. It is naturally also possible to provide more sheet metal moldings 26 in a different arrangement.

LIST OF DESIGNATIONS

1 Worm gear mechanism
2 Housing
3 Worm
4 Worm gear
5 Pivotable bearing
6 Four point bearing
7 Pivot ring
8 Coupling
9 Drive shaft
10 Drive motor
11 Bearing (drive shaft)
12 Hydraulic pressure device
13 Prestressing spring
14 Hydraulic device
15 Pressure piece
16 Bearing (worm)
17 Nonreturn valve
18 Orifice bore
19 Oil space
20 Plunger
21 Compression spring
22 Sealing ring
23 Ball
24 Low pressure oil space
25 Gap
26 Sheet metal moldings
27 Elastomer

The invention claimed is:

1. An electric power assisted steering system for a motor vehicle, comprising:
   an electric drive motor;
   a worm gear mechanism operatively connected to a drive shaft of the electric drive motor;
   a prestressing device arranged to apply a radial load to a worm and configured as a hydraulic pressure device;
   a coupling configured to connect the drive shaft to the worm; and
   a pivotable bearing, the worm mounted by the pivotable bearing,
   wherein the hydraulic pressure device includes a nonreturn valve arranged to damp operating forces of the worm gear mechanism acting in a radial direction.

2. The electric power assisted steering system according to claim 1, wherein the hydraulic pressure device includes a compression spring arranged to absorb highly dynamic forces from the worm gear mechanism.

3. The electric power assisted steering system according to claim 1, wherein the hydraulic pressure device includes a prestressing spring arranged to prestress the worm.

4. The electric power assisted steering system according to claim 1, wherein the prestressing device is configured to compensate an operating force.

5. The electric power assisted steering system according to claim 1, wherein the pivotable bearing includes a pivot ring.

6. An electric power assisted steering system for a motor vehicle, comprising:
   an electric drive motor;
   a worm gear mechanism operatively connected to a drive shaft of the electric drive motor;
   a prestressing device arranged to apply a radial load to a worm and configured as a hydraulic pressure device;
   a coupling configured to connect the drive shaft to the worm; and
   a pivotable bearing, the worm mounted by the pivotable bearing,
   wherein the pivotable bearing is configured as a four point bearing having a pivot ring.

* * * * *